United States Patent [19]
White

[11] Patent Number: 5,887,908
[45] Date of Patent: Mar. 30, 1999

[54] PIPE SWIVEL JOINT ASSEMBLY

[75] Inventor: Joseph A. White, Toledo, Ohio

[73] Assignee: Matrix Service, Inc., Tulsa, Okla.

[21] Appl. No.: 922,783

[22] Filed: Sep. 3, 1997

Related U.S. Application Data

[60] Provisional application No. 60/049,320, Jun. 11, 1997.

[51] Int. Cl.$^6$ .................................................... F16L 27/00
[52] U.S. Cl. ...................... 285/147.1; 285/94; 285/181; 285/282; 285/351
[58] Field of Search ............................ 285/351, 32, 184, 285/181, 135.1, 147.1, 94, 282

[56] References Cited

U.S. PATENT DOCUMENTS

| | | | |
|---|---|---|---|
| 1,514,612 | 11/1924 | Glasgow | 285/181 X |
| 1,693,857 | 12/1928 | Moser . | |
| 1,865,181 | 6/1932 | Fisher | 285/135.1 |
| 2,341,449 | 2/1944 | Krone et al. | 285/181 X |
| 2,791,451 | 5/1957 | Rostan | 285/181 |
| 3,112,128 | 11/1963 | Knapp | 285/181 X |
| 3,142,498 | 7/1964 | Press | 285/12 |
| 3,186,737 | 6/1965 | Brundage | 285/351 X |
| 3,199,898 | 8/1965 | Faccou | 285/181 X |
| 3,880,451 | 4/1975 | Kinzbach | 285/92 |
| 4,735,444 | 4/1988 | Skipper | 285/351 X |
| 4,822,080 | 4/1989 | Darish | 285/184 X |
| 5,538,296 | 7/1996 | Horton | 285/351 X |

FOREIGN PATENT DOCUMENTS

| | | | |
|---|---|---|---|
| 1099297 | 9/1955 | France | 285/181 |
| 3831057 | 3/1990 | Germany | 285/181 |

*Primary Examiner*—Dave W. Arola
*Attorney, Agent, or Firm*—Head, Johnson & Kachigian

[57] ABSTRACT

A moveable swivel joint assembly for joining a pair of pipes. A male body member includes a first open end attachable to one of the pipes and a second end having external threads, with a recess in the second end on each side of the external threads. A female body member includes a first open end attachable to the other pipe and a second end having internal threads which mate with the male body member external threads. A pair of o-ring seals are provided, one o-ring seal residing in each recess in order to provide an internal and external seal for the swivel joint assembly while allowing rotation of the body members with each other.

7 Claims, 5 Drawing Sheets

PIPE SWIVEL JOINT ASSEMBLY

CROSS REFERENCE TO RELATED APPLICATION

This application is based on Provisional Application No. 60/049,320 entitled PIPE SWIVEL JOINT ASSEMBLY, filed Jun. 11, 1997.

BACKGROUND OF THE INVENTION

1. Field of the Invention

The present invention is directed to a swivel joint assembly for joining a pair of pipes together while allowing movement of the pipes with respect to each other. In particular, the present invention is directed to a pipe swivel joint assembly that will seal both internally and externally of the joint assembly.

2. Prior Art

Bulk liquid products, such as petroleum products, are often stored in large cylindrical storage tanks. Different types of roof structures are provided for the storage tanks. In one arrangement, a roof is supported and floats on the surface of the liquid product contained within the tank. The roof rises and falls as the level of fluid within the tank rises or falls. The floating roof is advantageous in that it minimizes product loss to the atmosphere. Floating roofs include pan-type, pontoon-type and double deck-type roofs. The roof and accompanying accessories are allowed to float from the lowest level to the maximum design liquid level and then return.

The roof and supporting structures must be designed to support specified loading conditions. The weight of rainfall on the roof is one such condition. Indeed, American National Standards Institute/American Petroleum Institute (ANSI/ API) Standard 650 addresses these issues. For example, the roof must be designed to support minimum loads per square foot.

Floating roofs will often be provided with roof drains. Each roof drain will include a water sump to collect water on the top of the roof. In a typical design, the roof sump will be connected to a jointed series of pipe lengths which pass through the interior of the tank and then through the base or sidewall of the tank. Accordingly, water or other liquids gathering on the top of the roof will be drawn off through the drain system. The pipe lengths and joints will be submerged in the liquid product in the tank. The pipes and the swivel joints will, thus, be subject to liquid both within the joints from the roof drainage and on the exterior from the liquid product in the tank.

Drains will be designed to prevent the roof from accumulating a water level greater than design at a maximum rainfall rate.

In the past, swivel joints have been constructed which utilize a plurality of ball bearings to facilitate movement of one member with the other.

There remains a need for a swivel joint that will require minimum assembly and that may be serviced easily.

It is, therefore, a principal object and purpose of the present invention to provide a moveable swivel joint assembly for joining a pair of pipes.

It is a further object and purpose of the invention to provide a swivel joint assembly for joining a pair of pipes which includes: a male body member having a first end attachable to one pipe and a second end having external threads with a recess on each side of the external threads; a female body member having a first end attachable to the other pipe and a second end having internal threads mates with the male body member external threads; and wherein one o-ring seal resides in each recess to provide an external and internal seal for the swivel joint assembly.

It is a further object and purpose of the present invention to provide a moveable swivel joint assembly including a shoulder extending radially from the male body member and a cushioning spacer o-ring juxtaposed between the female body member second end and the shoulder.

It is a further object and purpose of the present invention to provide a moveable swivel joint assembly wherein the male body member first end terminates in a flange connectable to one pipe and wherein the female body member first end terminates in a flange connectable to the other pipe.

It is a further object and purpose of the present invention to provide a moveable swivel joint assembly for a floating tank roof wherein at least one joint assembly joins at least one pair of pipes.

SUMMARY OF THE INVENTION

The present invention is directed to a pipe swivel joint assembly for joining a pair of pipes. In one embodiment of the invention, the swivel joint assembly will be used with a floating roof drain for a liquid storage tank. A sump or drain will collect water or other liquids that gather on the top of the roof. The sump or drain is a fluid conduit with a series of pipe lengths and flexible joints which pass through the inside of the tank. The drain pipes lead through the floor or the sidewall of the tank in order to drain water and liquid from the roof. When the liquid level in the storage tank changes, the level of the roof changes so that the joints rotate which allows the pipes to move in angular relation to each other.

The sump is connected to a fitting or fittings which, in turn, are connected to a first flexible swivel joint assembly of the present invention. The first swivel joint assembly is connected to a first pipe length which is, in turn, connected to a second flexible swivel joint of the present invention. The second swivel joint assembly is connected to a second pipe length. This pattern continues in similar sequence as the design requires. Because the roof floats, the angular relationship between the pipe lengths will change as the product liquid level in the tank changes.

The swivel joint assembly includes a male body member having a first open end which is attachable to one of the pipe lengths. The first end terminates in a flange which mates with a flange on the pipe end. The male body member also includes a second end having a series of external threads. The first end is oriented 90° from the second end. On the male body member second end, a recess is provided in the second end on each side of the external threads.

The swivel joint assembly also includes a female body member. The female body member includes a first open end attachable to another pipe length through a flange connection. The female body member also includes a second end having a series of internal threads. The internal threads mate with the male body member external threads in order to join the body members together. The threads also permit the body members to rotate with respect to each other. The second end of the female body member terminates in a flat face perpendicular to the axis.

An o-ring seal, which has a diameter greater than the depth of the recess, resides in each recess. The o-ring seals assist in providing an external and internal seal for the joint assembly. At the same time, the o-ring seals do not prevent rotational movement of the male body member with respect to the female body member or vice versa.

The male body member also includes a radially extending shoulder. A cushioning spacer o-ring is placed between the extending shoulder and the flat face of the second end of the female body member. The cushioning spacer o-ring acts as a buffer for proper orientation of the body members during assembly and installation. The cushioning spacer o-ring may be compressed so that its diameter will be reduced under pressure. Accordingly, as one body member is rotated with respect to the other, the cushioning spacer o-ring may be compressed. This will permit the body members to rotate with respect to each other without binding.

DETAILED DESCRIPTION OF THE PREFERRED EMBODIMENTS

Figure 1:
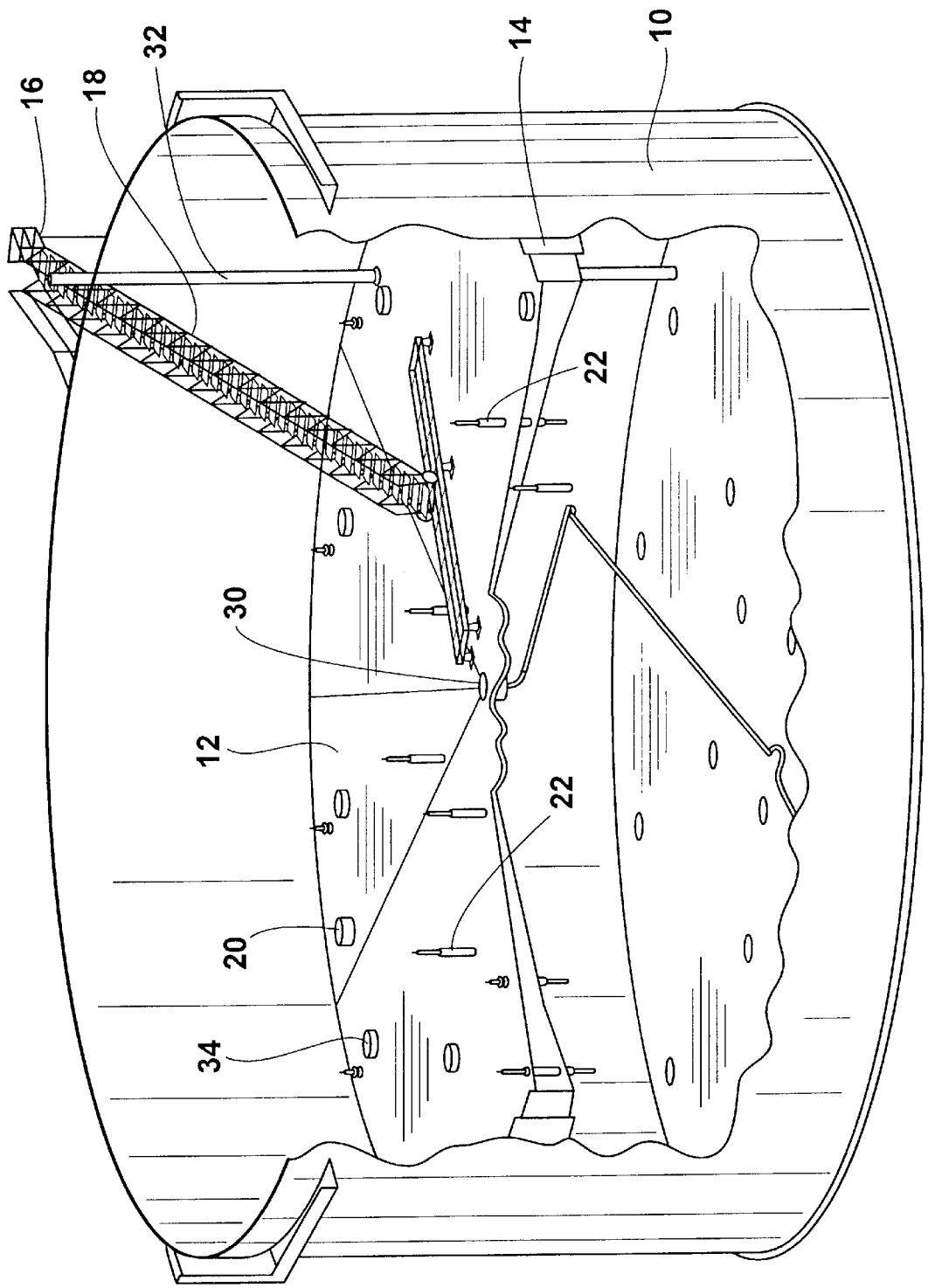
FIG. 1 is a perspective view of a bulk liquid tank partially cut away to reveal a floating roof along with a roof drain having a pipe swivel joint assembly constructed in accordance with the present invention.

Referring to the drawings in detail, FIG. 1 shows a liquid storage tank 10 that has been partially cut away to reveal a floating roof 12. The roof is allowed to move axially with respect to the tank in response to the level of liquid product in the tank. In the FIG. 1 embodiment, a double deck pontoon roof is employed although the teachings of the present invention will be applicable to other types of floating roofs.

The floating roof 12 includes a peripheral seal 14 around the roof circumference which mates with the internal wall of the tank 10. An elevated platform 16 and a rolling ladder assembly 18 allow access to the top of the roof 12. The roof may contain a float well 20 and bleeder vents 22.

The floating roof itself may have a slight pitch toward the center. A sump or drain 30 will collect water or other liquids that gather on the top of the roof. The storage tank may include a gauge pole 32. The floating roof may include a deck manway 34. The sump 30 is in fluid connection with a series of pipe lengths and flexible joints which pass through the inside of the storage tank. Each pipe length is less than the storage tank diameter to be described in detail herein. The drain pipes will lead through the floor or the sidewall of the storage tank in order to drain water from the roof. When the liquid level in the tank changes, the roof level changes and the pipes will move with respect to each other.

Figure 2:
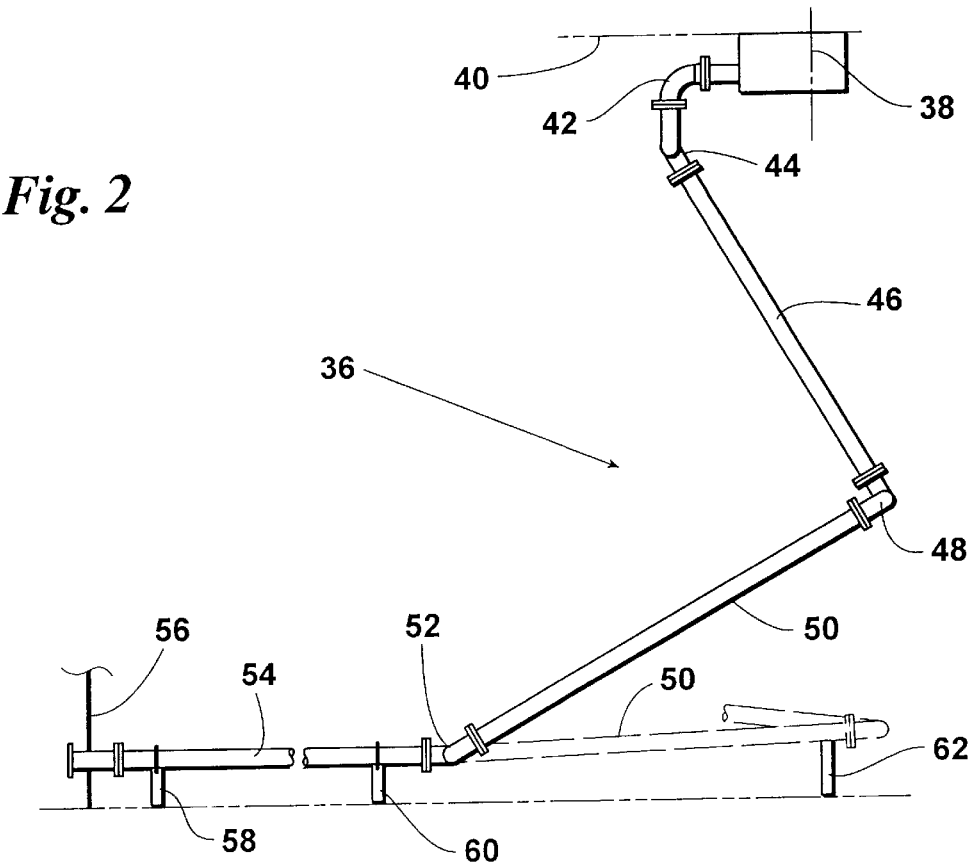
FIG. 2 illustrates an example of the pipe swivel joint assembly of the present invention utilized in a three joint configuration.
Figure 3:
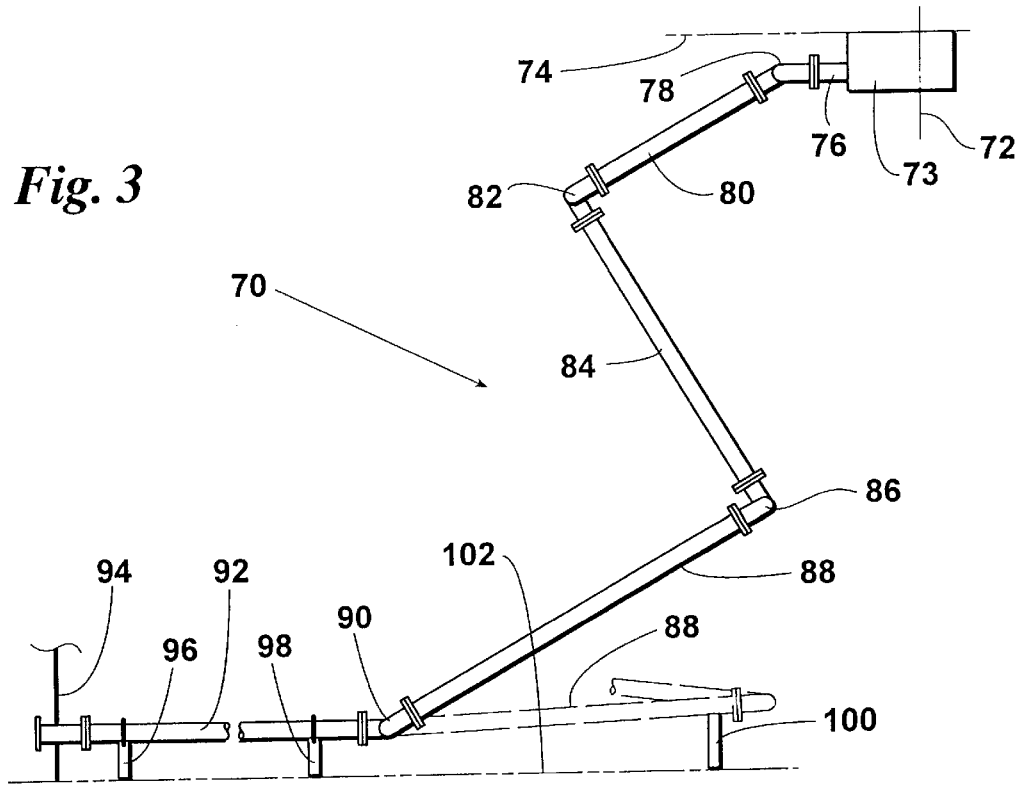
FIG. 3 illustrates use of a pipe swivel joint assembly of the present invention in a four joint configuration.

FIGS. 2 and 3 illustrate two types of drain configurations used. FIG. 2 shows a three joint design 36 as employed in FIG. 1. Line 38 indicates the center line of the sump 30, while dashed line 40 indicates the level of the floating roof 12 (not visible in FIG. 2).

The sump 38 is connected to a fitting or fittings 42 which, in turn, are connected to a flexible swivel joint assembly 44 of the present invention. The swivel joint assembly 44 is connected to a pipe length 46 which is, in turn, connected to another flexible swivel joint 48 of the present invention.

The swivel joint assembly 48 is connected to pipe length 50 which is connected to an additional flexible swivel joint 52. The swivel joint assembly 52 is connected to pipe length 54 which passes through tank wall 56. The pipe sections may be kept raised above the tank floor by supports 58, 60 and 62. The supports 58, 60 and 62 may be arranged so that the pipe lengths 50 and 54 are on an incline to promote drainage through the pipe lengths and swivel joint assembly.

The dashed lines indicate the pipe sections and joint assemblies in the folded down position. For example, the angular relationship between pipe length 46 and pipe length 50 will change as the liquid level changes and the roof level changes. Accordingly, the angle will increase as the roof level is raised. Conversely, the angle will decrease as the roof level is lowered.

FIG. 3 illustrates an alternate, flexible drain configuration with four swivel joints 70. Dashed line 72 indicates the center line of the sump while dashed line 74 indicates the level of the floating roof. Sump 73 will be connected to a pipe or piping 76. A pipe swivel joint assembly 78 of the present invention is connected to the piping 76 and is, in turn, connected to pipe length 80. An additional swivel joint assembly 82 is juxtaposed between the pipe length 80 and pipe length 84. Swivel joint 86 joins pipe length 84 and pipe length 88 together. Finally, flexible joint assembly 90 joins the pipe length 88 and piping 92 which leads through tank wall 94 to drain water from the roof. A series of supports 96, 98 and 100 keep the piping above the level of the tank floor 102.

The dashed lines indicate the pipe sections and joint assemblies in the folded down position.

A fluid conduit is, thus, formed from the roof drain to the discharge through the tank wall. It will be appreciated from the foregoing that the drain system will carry water from the roof while being submerged in liquid product, so that the flexible joints must seal both internally and externally.

Various other joint configurations are, of course, possible within the teachings of the present invention.

Figure 4:
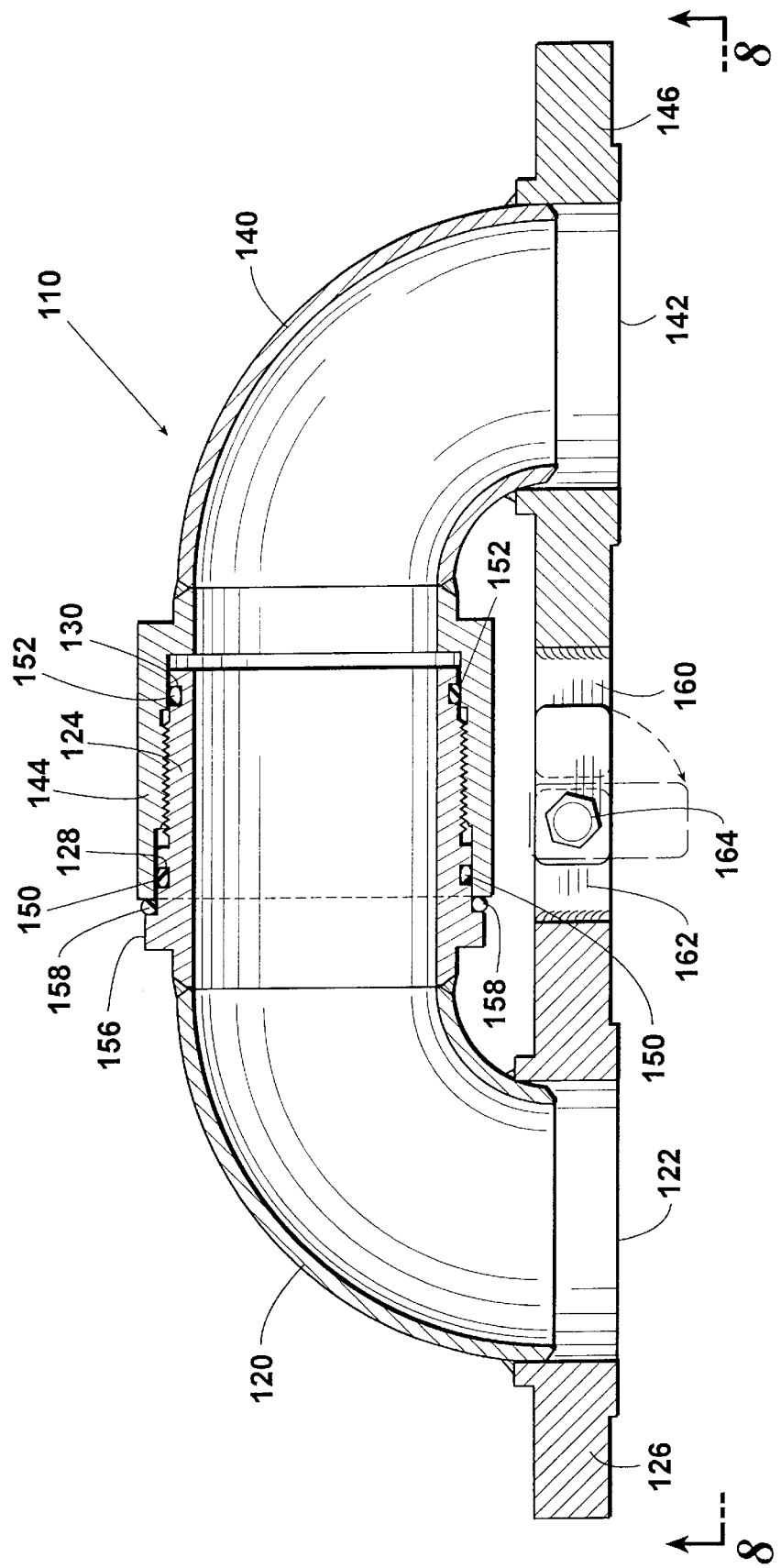
FIG. 4 is a cross sectional view of the pipe swivel joint assembly of the present invention shown in FIGS. 1, 2 and 3.

FIG. 4 illustrates one swivel joint assembly 110 of the present invention as illustrated in the configurations of FIGS. 1, 2 and 3. The swivel joint assembly 110 may be constructed of carbon steel or other material.

Figure 5:
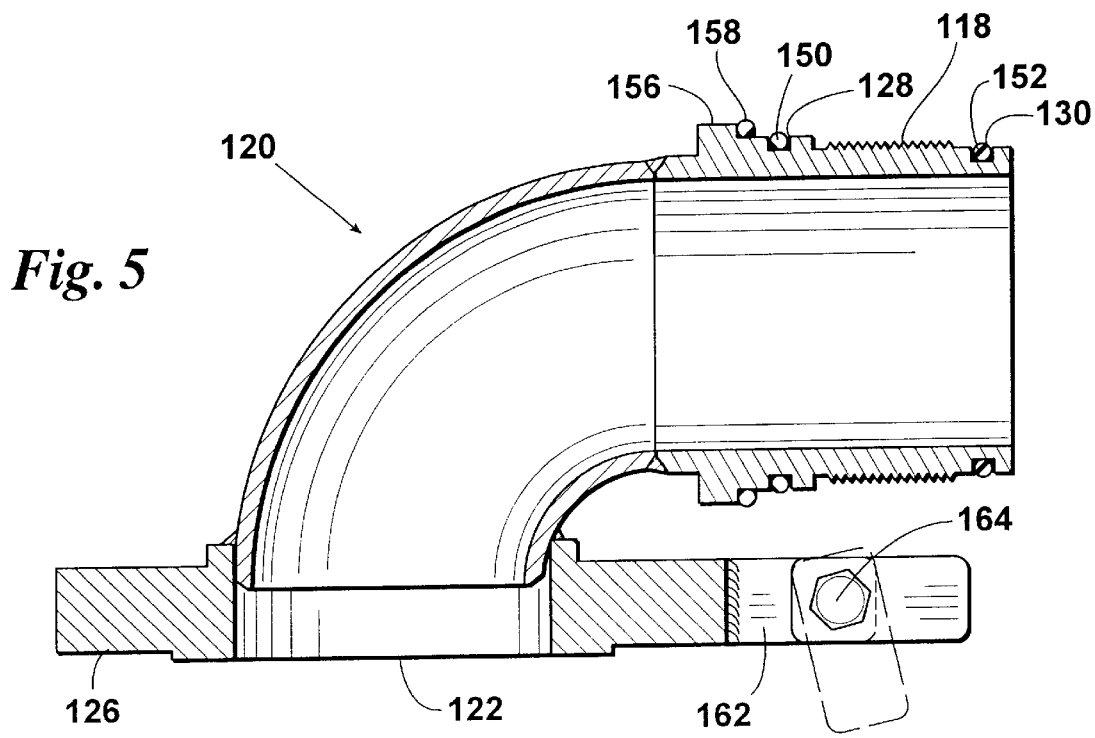
FIG. 5 is a cross-sectional view of a male body member of the pipe swivel joint assembly shown in FIG. 4.

The joint assembly 110 includes a male body member 120 which includes a first open end 122 which will be attachable to one of the pipe lengths. FIG. 5 illustrates the male body member 120 apart from the assembly. The male body member 120 also includes a second end 124 having a series of external threads 118.

In the present embodiment, the first end 122 terminates in a flange 126 which will mate with a flange on the pipe end (not shown). In the embodiment shown, the first end 122 is oriented ninety degrees (90°) from the second end 124.

On the male body member second end 124, a recess is provided in the second end on each side of the external threads as shown at 128 and 130.

Figure 6:
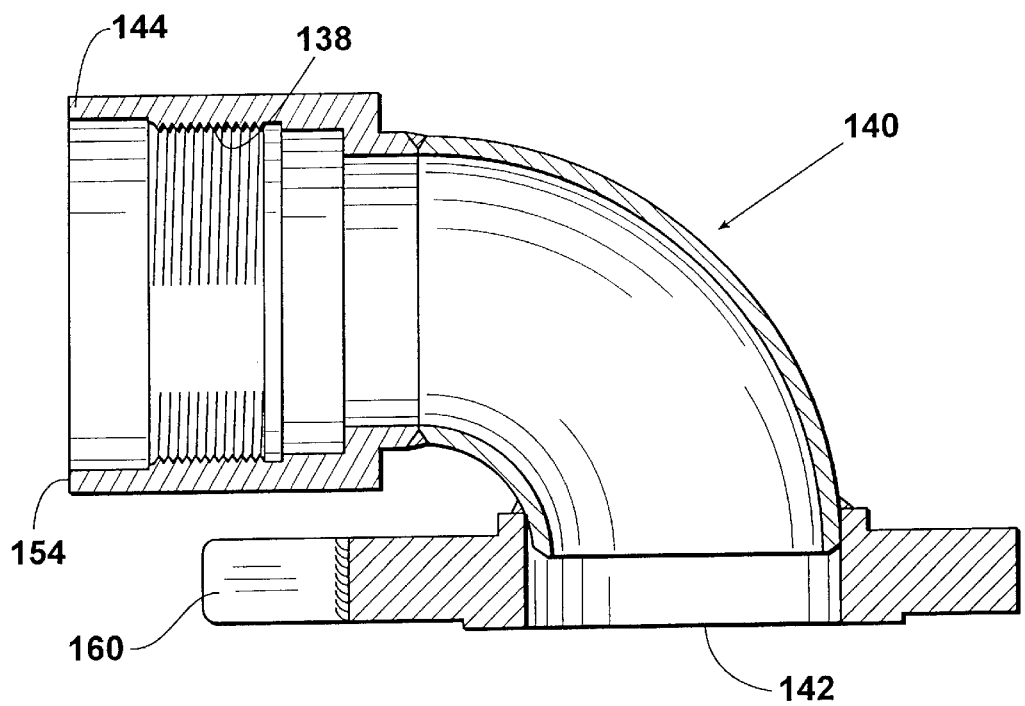
FIG. 6 is a cross-sectional view of a female body member of the pipe swivel joint assembly shown in FIG. 4.

Returning to a consideration of FIG. 4 and with reference to FIG. 6, the swivel joint assembly 110 also includes a female body member 140. The female body member 140 includes a first open end 142 attachable to another pipe length (not shown). The female body member 140 also includes a second end 144 having a series of internal threads 138. The internal threads 138 mate with the male body member external threads 118 to join the body members together.

The first end 142 of the female body member terminates in a flange 146 which will be joined with a flange on the adjoining pipe end (not shown).

The internal and external threads permit the male body member 120 to rotate with respect to the female body member 140. An o-ring seal 150 and 152 will reside in each recess, 128 and 130, respectively. The depth of each recess is less than the diameter of the o-ring seal. Thus, the 0-rings are wedged between the second end 144 of the female body member 140 and the recesses. The o-ring seals 150 and 152 assist in providing an external and an internal seal for the swivel joint assembly. At the same time, the o-ring seals 150 and 152 do not prevent rotational movement of the male body member 120 with respect to the female body member 140 or vice versa.

As best seen in FIG. 6, the female body member second end 144 terminates in a flat face 154 which is perpendicular to the axis of the second end.

As best seen in FIGS. 4 and 5, the male body member 120 also includes a radially extending shoulder 156 spaced back from the second end 124. A cushioning spacer o-ring 158 is placed between the shoulder 156 and the second end 144 of the female member. The cushioning spacer o-ring 158 acts as a buffer for proper orientation of the body members during assembly and installation of the swivel joint assembly.

FIG. 6 illustrates the female body member 140 apart from the swivel joint assembly. The cushioning spacer o-ring 158 may be compressed by the flat face 154 of the second end 144 so that the o-ring diameter will be reduced under pressure.

The female body member 140 may also include an optional opening for a grease nipple to insert lubricant between the external and internal threads (not shown).

Figure 7:
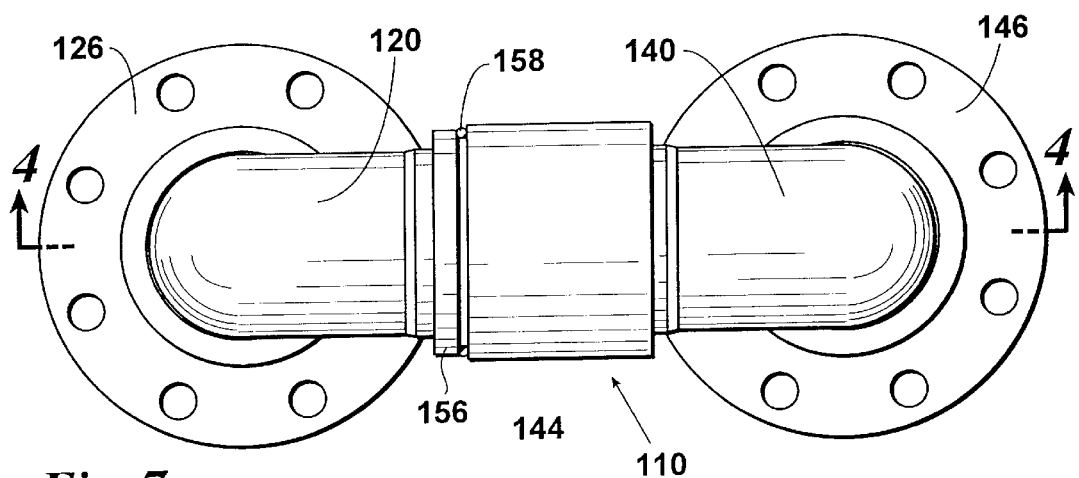
FIG. 7 is a top plan view of the pipe swivel joint assembly shown in FIG. 4.

FIG. 7 illustrates a top plan view of the swivel joint assembly 110 shown in FIG. 4. The position of the spacer o-ring 158 is visible. Depending on the rotation of the male body member with respect to the female body member, the space between the shoulder 156 and the second end of the female member 140 will increase or decrease.

During installation, the spacer o-ring 158 prevents the body members from being tightened too tightly, thereby preventing binding of the joint.

Figure 8:
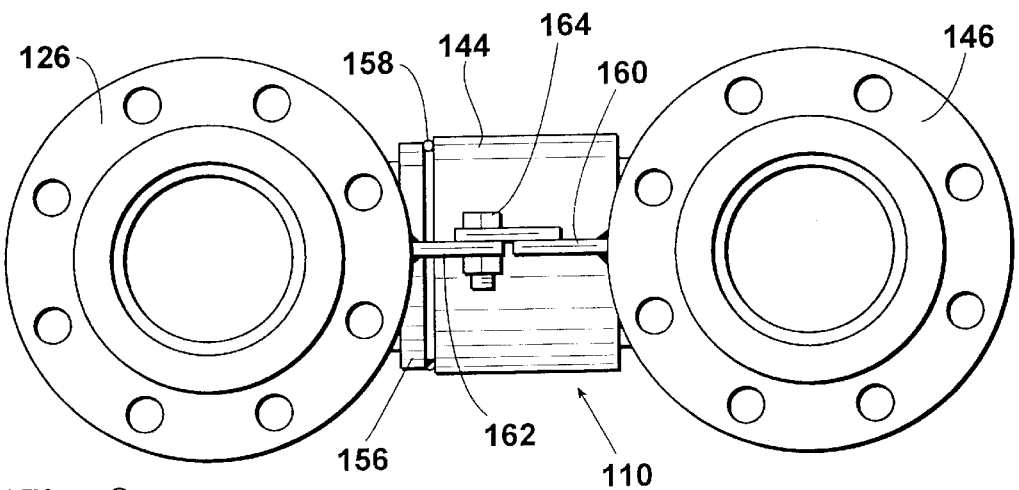
FIG. 8 is a rear plan view of the pipe swivel joint assembly shown in FIG. 4.
Figure 9:
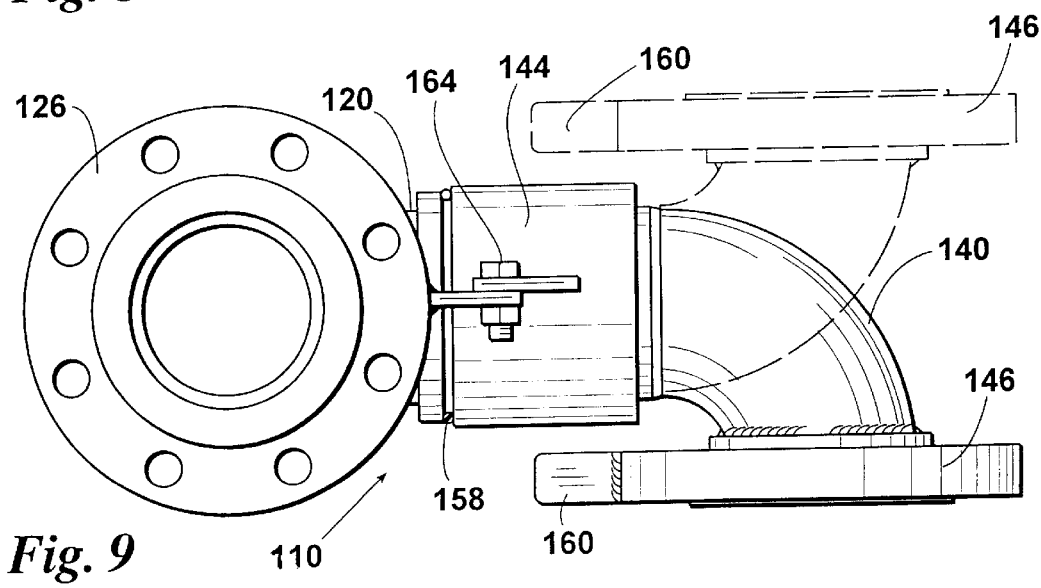
FIG. 9 illustrates the pipe swivel joint assembly in alternate positions.

FIG. 8 is a rear plan view of the swivel joint assembly 110. FIGS. 8 and 9 illustrate an optional safety feature to prevent rotation more than approximately 350°. The flange 146 of the female body member 140 has an extending tab 160 that aligns with an extending tab 162 on the flange 126 of the male body member 120. While the body members are allowed to rotate, they can not rotate past the point where the tabs 160 and 162 intersect. Extending tab 162 may be composed of two pieces and have a bolt and nut 164 to allow the tab 162 to be moved during installation or during removal. FIG. 4 shows the alternate positioning of the tab 162 in dashed lines for installation or servicing of the joint assembly.

Whereas, the present invention has been described in relation to the drawings attached hereto, it should be understood that other and further modifications, apart from those shown or suggested herein, may be made within the spirit and scope of this invention.

What is claimed is:

1. A moveable swivel joint assembly for joining a pair of pipes, which assembly comprises:

a male body member including a male body first end attachable to one of the pipes and a male body second end having external threads, with a recess in said male body second end on each side of said external threads;

a female body member including a female body first end attachable to the other pipe and a female body second end having internal threads which mate with said male body member external threads;

a pair of o-ring seals, one said o-ring seal residing in each said recess to provide an external and an internal seal for said joint assembly while allowing sealed rotation of said body members with each other; and a shoulder extending radially from said male body member and a cushioning spacer O-ring juxtaposed between said female body second end and said shoulder, wherein said cushioning spacer o-ring prevents said body members from binding on each other.

2. A moveable swivel joint assembly as set forth in claim 1 wherein said male body first end terminates in a flange connectable to one of the pipes and wherein said female body first end terminates in a flange connectable to said other pipe.

3. A moveable swivel joint assembly as set forth in claim 2 wherein said joint assembly and the pipes form a fluid conduit in communication with a roof sump or drain.

4. A moveable swivel joint assembly as set forth in claim 1 wherein the depth of each said recess in said male body second end is less than the diameter of said o-ring seals.

5. A moveable swivel joint assembly for a floating tank roof wherein said joint assembly joins a pair of pipes, which assembly comprises:

a first pipe attachable to a male body first end of a male body member, said male body member including a male body second end having external threads and a recess in said male body second end on each side of the external threads;

a second pipe in angular relation to said first pipe, said second pipe attachable to a female body first end of a female body member, said female body member including a female body second end having internal threads which mate with said male body external threads;

a pair of o-ring seals, one said o-ring seal residing in each said recess to provide an external and internal seal; and a shoulder extending radially from said male body wherein said female body second end terminates in a flat face and a cushioning spacer O-ring is juxtaposed between said shoulder and said flat face.

6. A moveable swivel-joint assembly as set forth in claim 1 wherein each of the pair of pipes is moveable with relation to the other, each pipe moveable in a plane parallel to each other.

7. A moveable swivel joint assembly as set forth in claim 1 wherein said male body first end and said female body first end are oriented approximately 180° radially.

* * * * *